Patented Dec. 20, 1932

1,891,827

UNITED STATES PATENT OFFICE

HENRY MONTAGUE MINES, OF LIVERPOOL, ENGLAND

PHOSPHORESCENT OR LUMINOUS MASSES OR COMPOUNDS

No Drawing. Application filed December 20, 1930, Serial No. 503,857, and in Great Britain October 18, 1929.

This invention relates to phosphorescent or luminous masses or compounds and is especially characterized in that the finished phosphorescent or luminous mass or compound is in a state sufficiently finely divided for incorporation without grinding—which is known to injure the luminous properties of phosphorescent compositions—in any suitable medium adapted to act as a paint-forming carrier, without loss of phosphorescent properties.

A phosphorescent or luminous mass or compound, according to my invention, includes base compositions or materials (hereinafter for convenience of reference, designated "bases") consisting of:—

Approximately

Base A 43400 parts by weight strontium carbonate.
10850 parts by weight calcium carbonate.
2170 parts by weight magnesium carbonate.

56420

Base B 1085 parts by weight lithium carbonate.
542½ parts by weight rubidium carbonate.
542½ parts by weight aluminium silicate.

2170

Base C

2278½ parts by weight suitable carbonaceous matter (such as starch).

Base D

6835½ parts by weight sulphur.

Base E

3½ parts by weight of one or more substances hereinafter referred to as "phosphorogens"

Incorporated with said bases is or are one or more suitable metallic salts (hereinafter referred to as "luminophores").

Treatment is effected as hereinafter described.

It is to be stated that a phosphorogen is a rare earth or heavy metal in the form of a readily soluble salt, which, when introduced as an impurity into Bases A, B, C and D in a finely divided state, may be considered to be directly responsible for the phenomenon of phosphorescence. It acts in some manner as a light emission centre. A luminophore may be any suitable readily soluble metallic salt which, by acting as a flux, will convey the phosphorogens throughout the entire compound when subjected to heat treatment.

It is assumed that the phosphorogens, in combination with the luminophores, are responsible for the colour of the phosphorescent light which luminous masses are capable of emitting.

According to the process of manufacture:

The ingredients of Base A are purified by the usual chemical processes, thoroughly dried, placed in an oxidizing furnace and heated to form a compound oxide which is allowed to cool and is then ground as finely as possible, preferably in a porcelain mill or a paint grinding machine, fitted with porphyry rollers.

Said compound oxide is now thoroughly incorporated with Bases B, C, D and E, together with a luminophore or luminophores (to produce the particular colour of phosphorescence required), and the mixture is heated in a non-oxidizing furnace at and for desired temperature and time—see examples hereinafter.

The mixture, after cooling, is again ground as finely as possible and re-heated in the presence of a current of dry hydrogen.

The luminous mass or compound when cool—remains in a finely divided state, and may, if desired (and without grinding) be mixed with finely pulverized resins, such as copal, dammar, or the like, to which are added suitable solvents in sufficient quantity to act as a carrier for the purpose of producing luminous paint: or it may be mixed with carriers such as solutions of nitrocellulose or cellulose acetate or their derivatives to produce a paint. For the purpose of producing a flat enamel paint of high-covering value the mixed luminous powder and powdered resins may be incorporated with suitable quantities of zinc sulphide (white), barium sulphate (white) zinc sulphate and calcium carbonate, together with turpentine and linseed oil which has been prepared in copper vessels and is free from iron, lead, manganese or cobalt.

Example 1

For the production of a luminous mass giving a violet phosphorescent light:—

Approximately
- Base A
- Base B
- Base C
- Base D
- 1085 parts by weight sodium chloride
- 1085 parts by weight potassium chloride
- 434 parts by weight manganese chloride
} luminophores
- 1 part by weight thorium nitrate
- 2½ parts by weight bismuth nitrate
} phosphorogens (Base E.)

Heated for 30 to 90 minutes at temperature of about 1250° C.

Example 2

For production of luminous mass giving blue phosphorescent light:—

Approximately
- Base A
- Base B
- Base C
- Base D
- 1302 parts by weight sodium sulphate
- 1302 parts by weight potassium sulphate
} luminophores
- 1 part by weight thorium nitrate
- 2½ parts by weight bismuth nitrate
} phosphorogens (Base E)

Heated for 30 to 90 minutes at temperature of about 650° C.

Example 3

For production of luminous mass giving indigo phosphorescent light:—

Approximately
- Base A
- Base B
- Base C
- Base D
- 1085 parts by weight sodium hyposulphate
- 1085 parts by weight potassium bi-chromate
- 434 parts by weight calcium fluoride
} luminophores
- 1 part by weight thorium nitrate
- 2½ parts by weight bismuth nitrate
} phosphorogens (Base E)

Heated for 30 to 90 minutes at temperature of from about 500° C. to about 600° C.

Example 4

For production of luminous mass giving green phosphorescent light:—

Approximately
- Base A
- Base B
- Base C
- Base D
- 1302 parts by weight barium sulphate
- 1302 parts by weight sodium sulphate
} luminophores
- 1 part by weight thorium nitrate
- 2½ parts by weight thallium nitrate
} phosphorogens (Base E)

Heated for 30 to 90 minutes at temperature of from about 750° C. to 800° C.

Example 5

For production of luminous mass giving yellow phosphorescent light:—

Approximately
- Base A
- Base B
- Base C
- Base D
- 1085 parts by weight sodium chloride
- 1085 parts by weight sodium carbonate
- 434 parts by weight manganese chloride
} luminophores
- 1 part by weight thorium nitrate
- 2½ parts by weight erbium nitrate
} phosphorogens (Base E)

Heated for 30 to 90 minutes at temperature of about 750° C.

Example 6

For production of luminous mass giving orange phosphorescent light:—

Approximately
- Base A
- Base B
- Base C
- Base D
- 1085 parts by weight sodium chloride
- 1085 parts by weight potassium chloride
- 217 parts by weight manganese chloride
- 217 parts by weight barium sulphate
} luminophores
- 1 part by weight thorium nitrate
- 2½ parts by weight rubidium nitrate
} phosphorogens (Base E)

Heated for 30 to 90 minutes at temperature of about 1300° C.

Example 7

For production of luminous mass giving red phosphorescent light:—

Approximately
- Base A
- Base B
- Base C
- Base D
- 1085 parts by weight sodium fluoride
- 434 parts by weight manganese sulphate
- 542½ parts by weight rubidium sulphate
- 542½ parts by weight barium sulphate
} luminophores
- 1 part by weight thorium nitrate
- 1 part by weight nickel sulphate
- 1½ parts by weight silver nitrate
} phosphorogens (Base E)

Heated for 30 to 90 minutes at temperature of about 800° C.

Where practicable, said phosphorogens are preferably introduced in the form of alcholic solutions.

It will be understood that colours other than said spectrum colours may also be produced by varying combinations of phosphorogens and luminophores or/and by varying the temperatures and time periods of furnacing.

What I claim as my invention and desire to secure by Letters Patent is:—

The manufacture or production of a phosphorescent or luminous mass or compound, by heating strontium carbonate, calcium carbonate and magnesium carbonate in an oxidizing furnace; grinding the compound oxide so formed and incorporating the same with lithium carbonate, rubidium carbonate, aluminium silicate, carbonaceous matter, sulphur, one or more phosphorogens and one or more luminophores; heating the mixture in a non-oxidizing furnace; grinding the mixture; and re-heating the mixture in the presence of a current of dry hydrogen.

In testimony whereof I affix my signature.

HENRY MONTAGUE MINES.